(12) United States Patent
Inoue

(10) Patent No.: US 6,769,948 B1
(45) Date of Patent: Aug. 3, 2004

(54) METHOD OF FABRICATING A DISPLAY PANEL AND METHOD OF RELOCATING A DISPLAY PANEL

(75) Inventor: Yoshiyasu Inoue, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 09/478,198

(22) Filed: Jan. 5, 2000

(30) Foreign Application Priority Data

Jan. 8, 1999 (JP) .......................................... 11-002545

(51) Int. Cl.$^7$ .............................. H01J 9/00; H01J 9/46; H01J 9/48
(52) U.S. Cl. .......................... 445/66; 445/24; 349/187; 349/189
(58) Field of Search .............................. 455/24, 23, 25, 455/3; 349/142, 187, 106, 139, 189, 190; 414/935, 936, 937, 938, 939, 940, 941

(56) References Cited

U.S. PATENT DOCUMENTS

| | | | |
|---|---|---|---|
| 4,099,550 A | * | 7/1978 | Matsuzaki et al. ........... 349/189 |
| 5,372,471 A | * | 12/1994 | Wu .............................. 414/940 |
| 5,509,771 A | * | 4/1996 | Hiroki .......................... 414/937 |
| 5,568,297 A | * | 10/1996 | Tsubota et al. ............... 445/25 |
| 5,915,957 A | * | 6/1999 | Tanigawa ..................... 414/937 |
| 6,181,408 B1 | * | 1/2001 | von Gutfeld et al. ........ 349/189 |
| 6,321,898 B1 | * | 11/2001 | Inoue et al. ............ 414/222.07 |

FOREIGN PATENT DOCUMENTS

| | | |
|---|---|---|
| JP | 56-43718 A | 4/1981 |
| JP | 64-57730 A | 3/1989 |
| JP | 2-122647 | 5/1990 |
| JP | 3-28821 A | 2/1991 |
| JP | 04-10454 A | 1/1992 |
| JP | 6-51260 A | 2/1994 |
| JP | 7-153816 | 6/1995 |
| JP | 7-235582 A | 9/1995 |
| JP | 8-198405 A | 8/1996 |
| JP | 8-274144 A | 10/1996 |
| JP | 9-104986 A | 4/1997 |
| JP | 9-115868 A | 5/1997 |
| JP | 9-244038 A | 9/1997 |
| JP | 10-41369 A | 2/1998 |
| JP | 10-245123 A | 9/1998 |
| JP | 10-335425 A | 12/1998 |

* cited by examiner

Primary Examiner—Nimeshkumar D. Patel
Assistant Examiner—Mariceli Santiago
(74) Attorney, Agent, or Firm—Sughrue Mion, PLLC

(57) ABSTRACT

A method of fabricating a display panel includes a first step, a second step which is to be carried out immediately before the first step, and a third step which is to be carried out immediately after the first step. The first step takes longer time to be carried out per a display panel than those of the second and third steps. The number of display panels to be processed in the first step is greater than both the number of display panels having been processed in the second step and the number of display panels to be introduced into the third step. For instance, the first step includes the first relocation step of relocating display panels into a first cassette used in the first step from a second cassette used in the second step in the greater number than the number of display panels having been processed in the second step, and the second relocation step of relocating display panels from the first cassette into a third cassette used in the third step in the smaller number than the number of display panels having been processed in the first step.

78 Claims, 10 Drawing Sheets

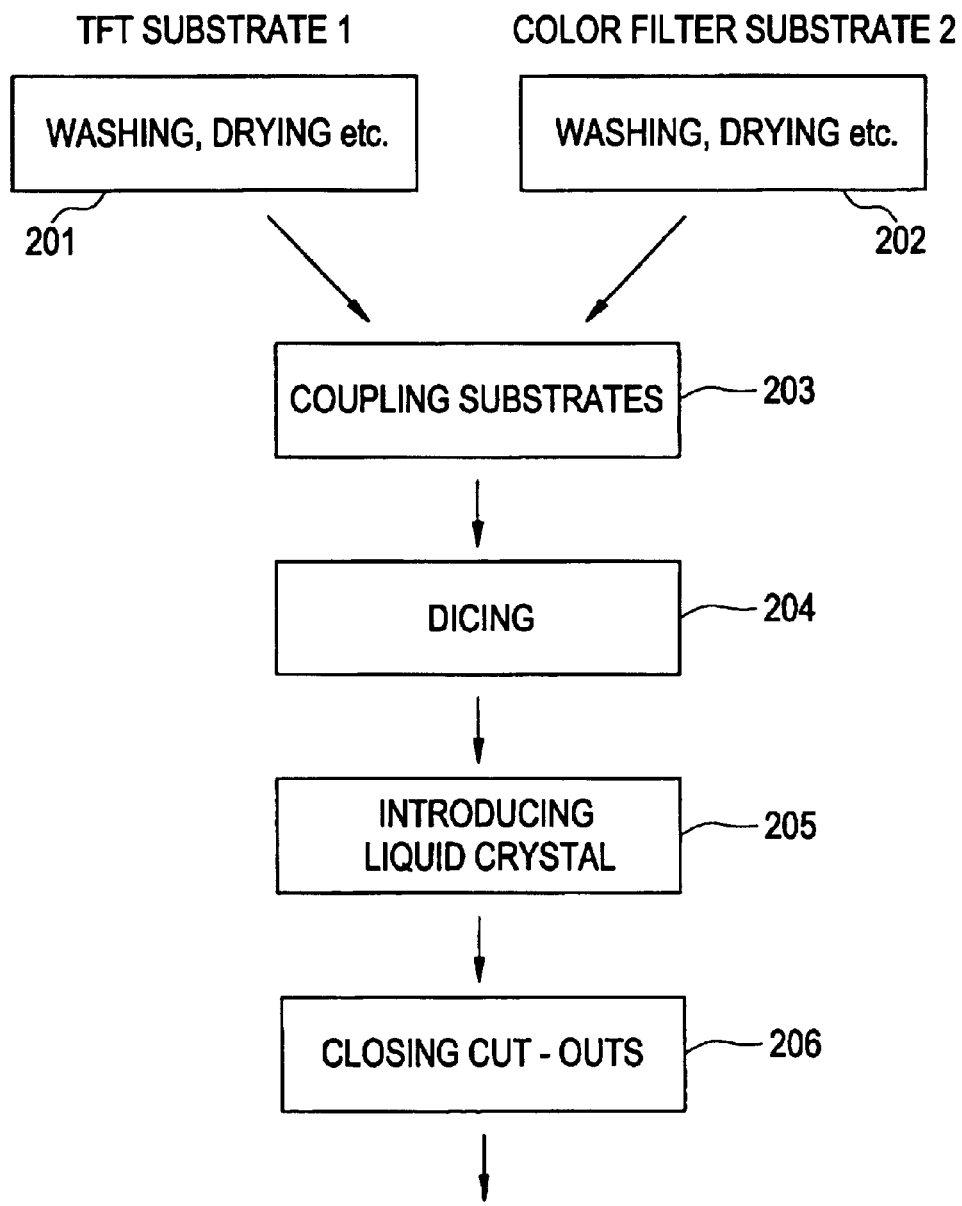

METHOD OF FABRICATING A DISPLAY PANEL AND METHOD OF RELOCATING A DISPLAY PANEL

BACKGROUND OF THE INVENTION

1. Field of the Invention

The invention relates to a method of fabricating a display panel and a method of relocating a display panel, and more particularly to those methods including a step of relocating display panels from a first cassette to a second cassette.

2. Description of the Related Art

Electronic devices are generally designed to include a display panel for displaying an output. A liquid crystal display among display panels is in particular widely used for a personal computer, a word processor and other similar apparatuses because of small power-consumption, small thickness, light weight, and ability of being driven at a low voltage.

FIG. 1A is a perspective view of a liquid crystal display panel, and FIG. 1B is a cross-sectional view of the liquid crystal display panel illustrated in FIG. 1A.

The illustrated liquid crystal display panel is comprised of a thin film transistor (TFT) substrate 1 composed of glass, a color filter substrate 2 composed of glass, and a sealing material 3 coupling the substrates 1 and 2 to each other so that there is formed a space in the range of 5 to 6 $\mu$m therebetween. Liquid crystal is sealed within the space between the substrates 1 and 2.

As illustrated in FIG. 1B, the sealing material 3 is formed at a lower edge thereof with a cutout 4 through which liquid crystal is introduced into the space.

FIG. 2 is a flow chart of a method of fabricating a liquid crystal display panel.

First, a glass substrate is subject to steps 201 of washing, drying, printing of an alignment film, rubbing, printing of a sealing material and other necessary steps to thereby fabricate the TFT substrate 1. Another glass substrate is subject to steps 202 of washing, drying, printing of an alignment film, rubbing, distributing spacers and other necessary steps to thereby fabricate the color filter substrate 2.

The thus fabricated TFT substrate 1 and color filter substrate 2 are coupled to each other so that a gap is formed therebetween, in step 203.

The coupled substrates 1 and 2 are diced in step 204 into a plurality of liquid crystal display panels having a size, for instance, in the range of 12 to 15 inches. The dicing step 204 is comprised of the steps of scribing both the TFT substrate 1 and the color filter substrate 2 by means of a diamond cutter, applying impact to the scribed substrates 1 and 2, and separating the substrates 1 and 2 into liquid crystal display panels along scribed lines.

The thus separated liquid crystal display panel has such a shape as illustrated in FIG. 1A.

Then, liquid crystal is introduced into a gap formed in each of the thus fabricated liquid crystal display panels, in step 205. The step 205 is carried out as follows.

First, as illustrated in FIG. 3, a plurality of liquid crystal display panels P and a container containing liquid crystal 10 therein are put in a vacuum chamber 12. Then, air in the vacuum chamber 12 is exhausted.

When a pressure in the vacuum chamber 12 lowers to a sufficient degree, the liquid crystal display panels P are immersed into the liquid crystal 10 through the cut-outs 4.

Thereafter, air is introduced into the vacuum chamber 12 to thereby raise a pressure in the vacuum chamber 12 to an atmospheric pressure. As a result, the liquid crystal 10 is introduced into gaps in the liquid crystal display panels P due to capillarity and a difference in an internal pressure between the liquid crystal display panels P and the vacuum chamber 12.

After the liquid crystal 10 has been introduced into gaps in the liquid crystal display panels P, the cutouts 4 are closed in step 206 to thereby hermetically seal the liquid crystal display 10. For instance, the step 206 is comprised of sweeping the liquid crystal, coating resin sensitive to ultra-violet ray, and radiating ultra-violet ray.

Thereafter, steps of polishing, attaching a deflecting plate, making inspection and so on are carried out, and thus, there is completed a liquid crystal display panel.

In the above-mentioned steps, cassettes are employed for containing, transferring and processing display panels in each of the steps 204 to 206. In general, cassettes employed in each of the steps are designed to have the same shape. The reason why cassettes having the same shape are employed in those steps is that if a cassette has to have different shapes for different liquid crystal display panels, it would not be possible to automate fabricating liquid crystal display panels, because liquid crystal display panels have different sizes.

If liquid crystal display panels having different sizes are to be fabricated in a fabrication line, those liquid crystal display panels are contained in a cassette by moving a partition plate in a cassette to thereby conform the cassette to the liquid crystal display panel in size.

However, the above-mentioned method of fabricating a liquid crystal display panel is accompanied with the following problem.

In these days, a liquid crystal display panel has been requested to be large in a size because of variety in fields in which a liquid crystal display panel is used, and to have a smaller gap in order to ensure a wider angle of visibility and enhancement in responsibility. A larger size and a smaller gap in a liquid crystal display panel cause a step of introducing liquid crystal per a unit number of panels to take longer time than other steps. For instance, with reference to FIG. 2, the step 205 of introducing liquid crystal takes time four to five times greater than time which the step 204 or 206 takes. Hence, it is quite necessary to shorten time which the step 205 takes.

In order to shorten time the step 205 takes, the number of apparatuses for introducing liquid crystal may be increased, for instance. However, those apparatuses are expensive. In addition, if those apparatuses are newly introduced into a fabrication line, a fabrication line and/or other fabrication steps might be modified accordingly.

Japanese Unexamined Patent Publication No. 7-153816 has suggested a method of relocating a substrate, comprising the steps of supporting one of substrate vertically standing in a first cassette, at side edges thereof, taking the substrate out of the first cassette, and vertically inserting the substrate into a second cassette.

Japanese Unexamined Patent Publication No. 2-122647 has suggested an apparatus for relocating a semiconductor wafer, comprised of a first wafer carrier containing a plurality of semiconductor wafers, a second wafer carrier containing no semiconductor wafers, a lift arm which lifts a semiconductor wafer up through a bottom of said first and second wafer carriers, and a clamping arm which clamps a semiconductor wafer upwardly lifted by said lift arm. The lift arm raises and lowers, and the clamp arm laterally moves to thereby relocate semiconductor wafers from the first wafer carrier to the second wafer carrier. The apparatus further includes a plurality of hands which can hold one to five semiconductor wafers, which hands can be automatically exchanged into the lift arms.

SUMMARY OF THE INVENTION

In view of the above-mentioned problem in the conventional method, it is an object of the present invention to provide a method of fabricating a display panel and a method of relocating a display panel both of which are capable of enhancing a fabrication yield in fabrication of display panels, in particular, shortening time which a step of introducing liquid crystal into a space formed between substrates takes.

There is provided a method of fabricating a display panel, including a first step and a second step which is to be carried out immediately before the first step, the first step taking longer time to be carried out per a display panel than that of the second step, the number of display panels to be processed in the first step being greater than the number of display panels to be processed in the second step.

It is preferable that the first step includes the relocation step of relocating display panels into a first cassette used in the first step from a second cassette used in the second step in the greater number than the number of display panels having been processed in the second step.

For instance, the relocation step may be comprised of the steps of (a) upwardly taking a display panel out of a first cassette in which display panels are stored, with the display panel being supported at upper and lower edges thereof, (b) supporting the display panel taken out of the first cassette, at lower and side edges thereof, (c) laterally transferring the display panel from a position above the first cassette to a position above a second cassette, and (d) supporting the display panel at upper and side edges thereof and lowering the display panel into the second cassette.

It is preferable that the step (a) further includes the step of compensating for a pitch at an upper edge of the display panel when the display panel is supported at the upper edge thereof.

It is preferable that the step (a) further includes the step of compensating for a pitch at a side edge of the display panel when the display panel is supported at the side edge thereof.

For instance, the step (a) may further include the steps of (a1) transferring a first cassette including display panels, into a first station, (a2) taking the display panels out of the first cassette in the first station, and (a3) transferring the first cassette out of the first station, and the step (d) may further include the steps of (d1) transferring a second cassette including no display panels into a second station, (d2) introducing display panels into the second cassette, and (d3) transferring the second cassette out of the second station.

It is preferable that the first cassette is transferred in a first direction in a first stream line and the second cassette is transferred in a second direction in a second stream line, the first and second directions are opposite to each other, the first and second stream lines being spaced away from each other and being in parallel with each other.

It is preferable that the method further includes the step (e) of rotating the second cassette in a horizontal plane by 90 degrees, the step (e) being to be carried out before or after the step (d).

It is preferable that the method further includes the step (f) of rotating the first cassette in a horizontal plane by 90 degrees, the step (f) being to be carried out before or after the step (a).

It is preferable that the first and second cassettes have the same size.

It is preferable that each of the first and second cassettes is comprised of (a) a pair of frames, (b) a plurality of shafts extending between the frames, and (c) a pair of panel-supporting plates, at least one of the panel-supporting plates being slidable along the shafts and being able to be fixed at any position.

It is preferable that the first step is a step of introducing liquid crystal into a space formed between two substrates.

There is further provided a method of fabricating a display panel, including a first step and a second step which is to be carried out immediately after the first step, the first step taking longer time to be carried out per a display panel than that of the second step, the number of display panels to be processed in the first step being greater than the number of display panels to be processed in the second step.

There is still further provided a method of fabricating a display panel, including a first step, a second step which is to be carried out immediately before the first step, and a third step which is to be carried out immediately after the first step, the first step taking longer time to be carried out per a display panel than those of the second and third steps, the number of display panels to be processed in the first step being greater than both the number of display panels to be processed in the second step and the number of display panels to be processed in the third step.

There is yet further provided a method of fabricating a display panel, including a first step and a second step which is to be carried out immediately before the first step, the first step taking longer time to be carried out per a display panel than that of the second step, the number of display panels to be processed in the first step being greater than the number of display panels having been processed in the second step.

There is still yet further provided a method of fabricating a display panel, including a first step and a second step which is to be carried out immediately after the first step, the first step taking longer time to be carried out per a display panel than that of the second step, the number of display panels to be processed in the first step being greater than the number of display panels to be introduced into the second step.

There is further provided a method of fabricating a display panel, including a first step, a second step which is to be carried out immediately before the first step, and a third step which is to be carried out immediately after the first step, the first step taking longer time to be carried out per a display panel than those of the second and third steps, the number of display panels to be processed in the first step being greater than both the number of display panels having been processed in the second step and the number of display panels to be introduced into the third step.

There is further provided a method of relocating display panels, including the steps of (a) upwardly taking a display panel out of a first cassette in which display panels are stored, with the display panel being supported at upper and lower edges thereof, (b) supporting the display panel taken out of the first cassette, at lower and side edges thereof, (c) laterally transferring the display panel from a position above the first cassette to a position above a second cassette, and (d) supporting the display panel at upper and side edges thereof and lowering the display panel into the second cassette.

The advantages obtained by the aforementioned present invention will be described hereinbelow.

In accordance with the present invention, it is possible in fabrication of a liquid crystal display panel, for instance, to process liquid crystal display panels in a step of introduction of liquid crystal by the unit number greater than both the unit number of liquid crystal display panels in a step of dicing, which is to be carried out immediately before the step of introduction of liquid crystal, and the unit number of liquid crystal display panels in a step of sealing, which is to be carried out immediately after the step of introduction of liquid crystal.

It is also possible to relocate display panels with high efficiency.

Hence, even if a conventional fabrication line is used as it is, it would not be necessary to increase the number of apparatuses for introducing liquid crystal into a space formed between substrates, and the fabrication line and other fabrication steps are not necessary to be modified. Hence, it would be possible to enhance an efficiency in fabrication steps of a liquid crystal display panel and in a fabrication line.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 is a flow chart of a method of fabricating a display panel.

DESCRIPTION OF THE PREFERRED EMBODIMENTS

First, hereinbelow is explained an apparatus for relocating a display panel which apparatus is to be used in both a method of fabricating a display panel and a method of relocating a display panel.

Figure 1A:
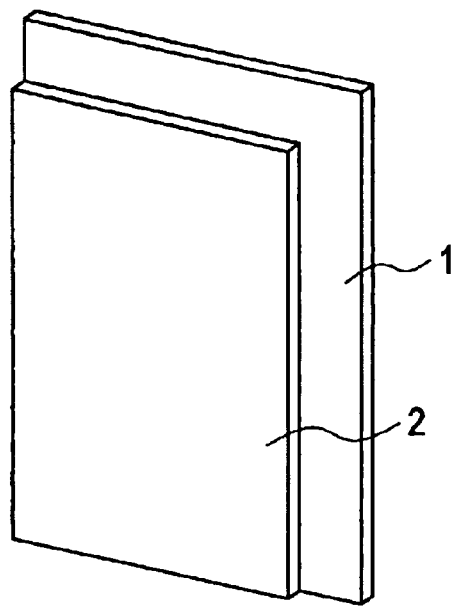
FIG. 1A is a perspective view of a display panel.
Figure 1B:
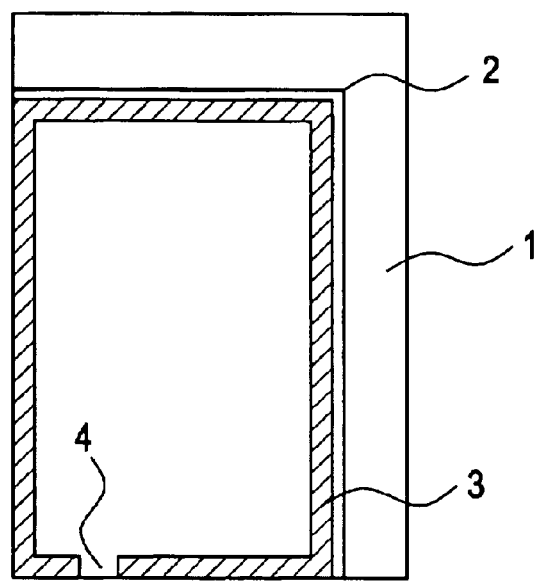
FIG. 1B is a cross-sectional view of the display panel illustrated in FIG. 1A.
Figure 3:
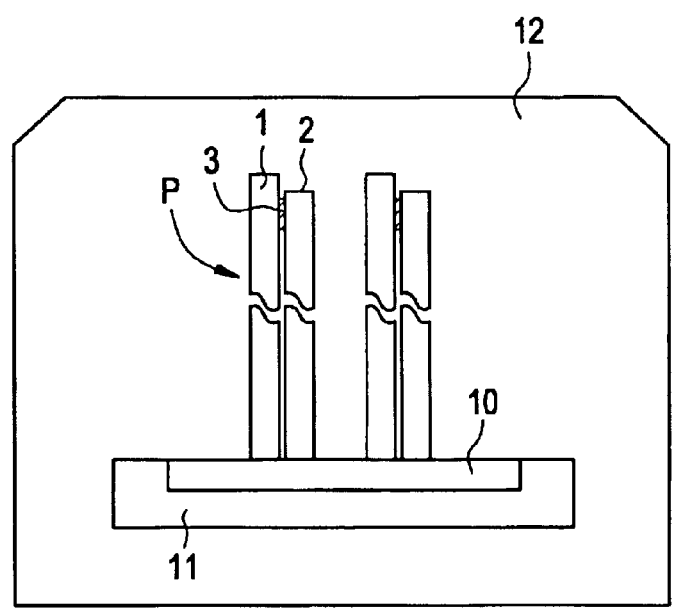
FIG. 3 is a cross-sectional view of a display panel under a step of introducing liquid crystal thereinto.
Figure 4:
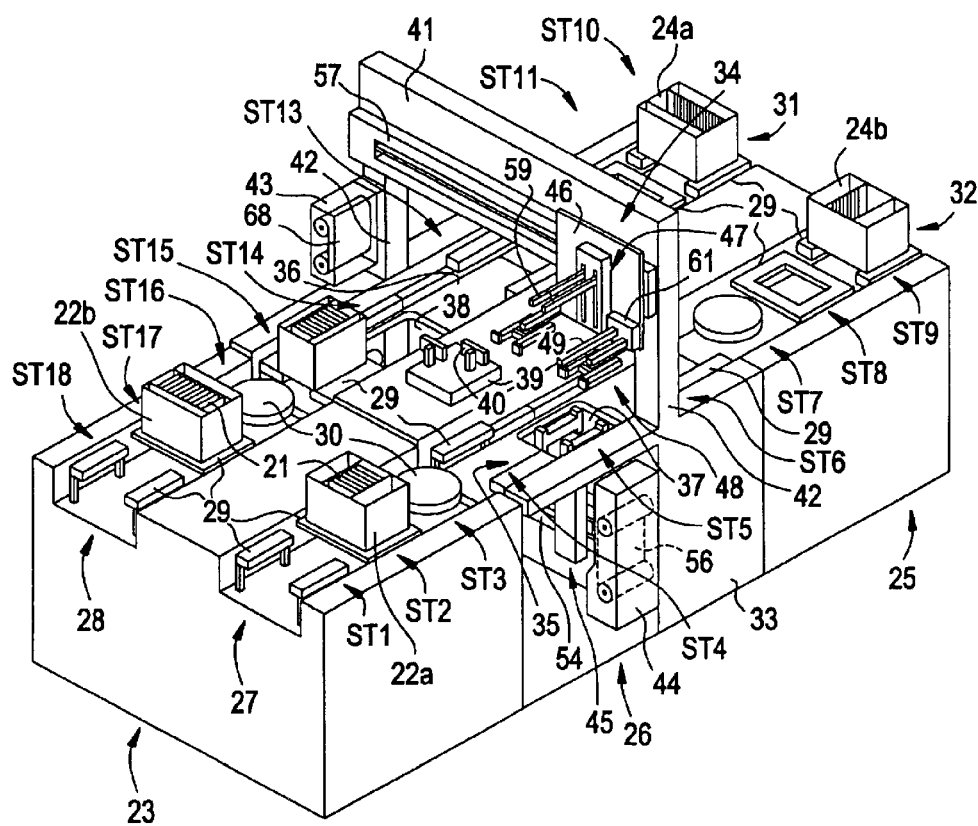
FIG. 4 is a perspective view of an apparatus for relocating a display panel used for carrying out a method of fabricating a display panel, in accordance with the present invention.

As illustrated in FIG. 4, an apparatus for relocating a display panel, used in a method of fabricating a display panel and a method of relocating a display panel, is comprised of a first unit 23 for transferring first cassettes 22a and 22b containing display panels 21 therein, a second unit 25 for transferring second cassettes 24a and 24b containing no display panels 21, and a third unit 26 for taking display panels 21 out of the first cassettes 22a and inserting those display panels 21 into the second cassette 24a.

The third unit 26 is arranged at the center of the apparatus for relocating a display panel. The first unit 23 is arranged this side of the third unit 26 in FIG. 4, and the second unit 25 is arranged beyond the third unit 26 in FIG. 4.

The first cassettes 22a, 22b and the second cassettes 24a, 24b are upwardly open, and the display panels 21 can be vertically inserted into the cassettes. In other words, the display panels 21 can be inserted into the cassettes so that a plane of the display panel 21 is perpendicular to a bottom of a cassette.

The first unit 23 is designed to include a fourth unit 27 at the right in FIG. 4, and a fifth unit 28 at the left in FIG. 4. The fourth unit 27 supplies the first cassettes 22a which contains the display panels 21 therein, to the third unit 26. The fifth unit 28 ejects the first cassette 22b into which the display panels 21 have been inserted in the third unit 26.

The fourth unit 27 includes a first station ST1 at which the first cassettes 22a temporarily stop when the fourth unit 27 supplies the first cassettes 22a to the third unit 26, a second station ST2, and a third station ST3. The first cassettes 22a are transferred through the first station ST1, the second station ST2, and the third station ST3 in this order. The first cassettes 22a are intermittently transferred.

Each of the first and second stations ST1 and ST2 is designed to include a cassette mount 29 on which the first cassette 22a is to be mounted, and the third station ST3 is designed to include a disc-shaped rotatable cassette rotary unit 30 on which the first cassette 22a can be horizontally turned.

Though it is possible to rotate the cassette rotary unit 30 to thereby turn the first cassette 22a in the third station ST3, and transfer the first cassette 22a to the third unit 26, the first cassette 22a may be transferred to the third unit 26 without rotating the cassette rotary unit 30, namely, without turning the first cassette 22a.

Similarly, the fifth unit 28 includes a sixteenth station ST16 at which the first cassettes 22b temporarily stop when the third unit 26 ejects the first cassettes 22b, a seventeenth station ST17, and an eighteenth station ST18. The first cassettes 22b are transferred through the sixteenth station ST16, the seventeenth station ST17, and the eighteenth station ST18 in this order in the fifth unit 28. Thus, the first cassettes 22a are transferred in the fourth unit 27 in a direction opposite to a direction in which the first cassettes 22b are transferred in the fifth unit 28. The first cassettes 22b are intermittently transferred.

Each of the seventeenth and eighteenth stations ST17 and ST18 is designed to include a cassette mount 29 on which the first cassette 22b is to be mounted, and the sixteenth station ST16 is designed to include a disc-shaped rotatable cassette rotary unit 30 on which the first cassette 22b can be horizontally turned.

The second unit 25 is designed to include a sixth unit 31 at the left in FIG. 4, and a seventh unit 32 at the right in FIG. 4. The sixth unit 31 supplies the second cassettes 24a which do not contain the display panels 21 therein, to the third unit 26. The seventh unit 32 ejects the second cassette 24b from which the display panels 21 have been taken out in the third unit 26.

The sixth unit 31 has almost the same structure as that of the fourth unit 27. Specifically, the sixth unit 31 includes a tenth station ST10 at which the second cassettes 24a temporarily stop when the second cassettes 24a are supplied to the third unit 26, an eleventh station ST11, and a twelfth station ST12 (not illustrated for simplification of FIG. 4). The second or empty cassettes 24a are transferred through the tenth station ST10, the eleventh station ST11, and the twelfth station ST12 in this order. The second cassettes 24a are intermittently transferred.

Similarly to the fourth unit 27, each of the tenth and eleventh stations ST10 and ST11 is designed to include a cassette mount 29 on which the second cassette 24a is to be mounted, and the twelfth station ST12 is designed; to include a disc-shaped rotatable cassette rotary unit 30 on which the second cassette 24a can be horizontally turned.

Similarly, the seventh unit 32 includes a seventh station ST7 at which the second or empty cassettes 24b temporarily stop when the third unit 26 ejects the second cassettes 24b, an eighth station ST8, and a ninth station ST9. The second cassettes 24b are transferred through the seventh station ST7, the eighth station ST8, and the ninth station ST9 in this order in the seventh unit 32. Thus, the second cassettes 24a are transferred in the sixth unit 31 in a direction opposite to a direction in which the second cassettes 24b are transferred in the seventh unit 32. The second cassettes 24b are intermittently transferred.

Similarly to the sixth unit 31, each of the eighth and ninth stations ST8 and ST9 is designed to include a cassette mount 29 on which the second cassette 24b is to be mounted, and the seventh station ST7 is designed to include a disc-shaped rotatable cassette rotary unit 30 on which the second cassette 24b can be horizontally turned.

Hereinbelow is explained the third unit 26 which relocates the display panels 21.

The third unit 26 is comprised of a base 33 and a display panel relocating unit 34 incorporated into the base 33. Though not clearly illustrated in FIG. 4, the third unit 26 is inclined about 1 degree towards the second unit 25. By arranging the third unit 26 to incline about 1 degree towards the second unit 25, the display panels 21 which vertically stand by virtue of gravitational force are all inclined in a direction, resulting in that the display panels 21 contained in the cassette are in a row at a constant pitch.

The base 33 includes an eighth unit 35 which transfers the first cassettes 22a and the second cassettes 24b, and a ninth unit 36 which transfers the second cassettes 24a and the first cassettes 22b.

The eighth unit 35 includes a fourth station ST4, a fifth station ST5 and a sixth station ST6. The first cassettes 22a are intermittently transferred through the fourth station ST4, the fifth station ST5 and the sixth station ST6 in this order.

The fifth station ST5 includes a rectangular opening 37 through which a device 45 of a tenth unit 34 raises and lowers the display panels 21. The display panels 21 are taken out of the first cassette 22a in the fifth station ST5. Accordingly, after the display panels 21 are taken out of the first cassette 22a having been transferred from the fourth station ST4 to the fifth station ST5, the first or full cassette 22a is turned into the second or empty cassette 24b, which is then transferred to the sixth station ST6.

Each of the fourth and sixth stations ST4 and ST6 is designed to include a cassette mount 29 on which the first cassette 22a or the second cassette 24b is to be mounted. The fifth station ST5 includes a cassette feeder (not illustrated) which shifts the first cassette 22a in a pitch-wise direction of the display panel 21 or in a length-wise direction of the apparatus in the fifth station ST5. By shifting or relocating the first cassette 22a by means of the cassette feeder, the later mentioned tenth unit 34 can increase or decrease the number of display panels 21 to be taken out of the first cassette 22a in one cycle.

The ninth unit 36 has almost the same structure as that of the eighth unit 35. Specifically, the ninth unit 36 includes a thirteenth station ST13, a fourteenth station ST14 and a fifteenth station ST15. The second or empty cassettes 24a are intermittently transferred through the thirteenth station ST13, the fourteenth station ST14 and the fifteenth station ST15 in this order.

The fourteenth station ST14 has a rectangular opening 38. The display panels 21 are inserted into the second cassette 24a by means of the tenth unit 34 in the fourteenth station ST14. Accordingly, after the display panels 21 are inserted into the second cassette 24a having been transferred from the thirteenth station ST13 to the fourteenth station ST14, the second or empty cassette 24a is turned into the first or full cassette 22b, which is then transferred to the fifteenth station ST15.

Similarly to the eighth unit 35, each of the thirteenth and fifteenth stations ST13 and ST16 is designed to include a cassette mount 29 on which the second cassette 24a or the first cassette 22b is to be mounted. The fourteenth station ST14 includes a cassette feeder (not illustrated) which shifts or relocates the second cassette 24a to thereby make it possible for the later mentioned tenth unit 34 to increase or decrease the number of display panels 21 to be taken out of the second cassette 24a in one cycle.

The base 33 is designed to include a unit 39 at the center thereof between the fifth and fourteenth stations ST5 and ST14. The first cassette 22a and the second cassette 24a are formed at a sidewall thereof with a groove. The unit 39 detects the groove of the first cassette 22a or the second cassette 24a having been stopped at the fifth or fourteenth station ST5 or ST14, by means of a sensor 40, to thereby compensate for a position at which the first cassette 22a or the second cassette 24a have stopped.

When a position at which the first cassette 22a or the second cassette 24a has stopped is to be compensated for, the above-mentioned cassette feeder (not illustrated) shifts or relocates the first cassette 22a or the second cassette 24a accordingly.

The tenth unit 34 includes a support block 42 having two legs 42. A sweeper unit 43 is provided at each of the legs 42 for removing extra liquid crystal having been adhered to later mentioned rollers 62. Only one sweeper unit 43 is illustrated in FIG. 4 for simplification of FIG. 4. The sweeper unit 43 is explained later in detail. The base 33 further includes sweeper units 44 having the same structure as that of the sweeper unit 43, below the fifth and fourteenth stations ST5 and ST14. The sweeper unit 44 is explained later in detail.

Hereinbelow is explained the tenth unit 34 incorporated in the base 33.

Figure 5:
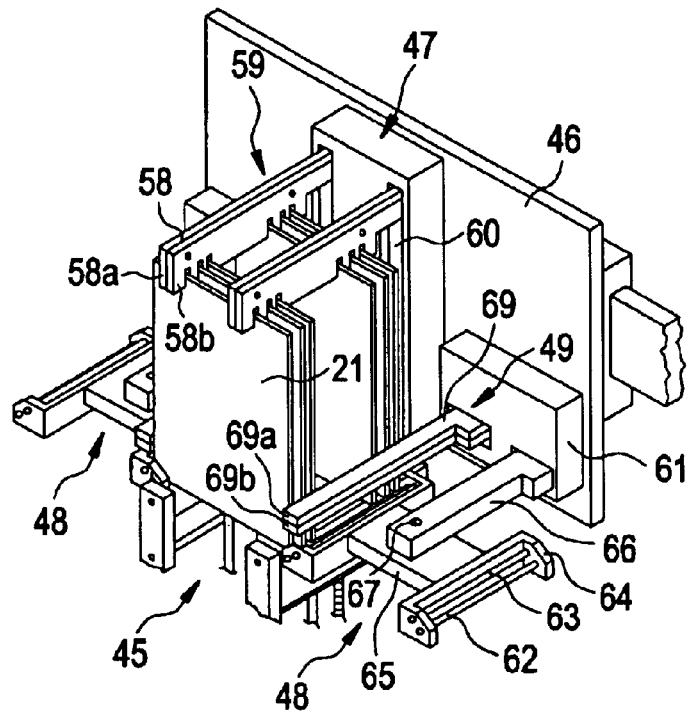
FIG. 5 is a perspective view of a unit for relocating a display panel.
Figure 6:
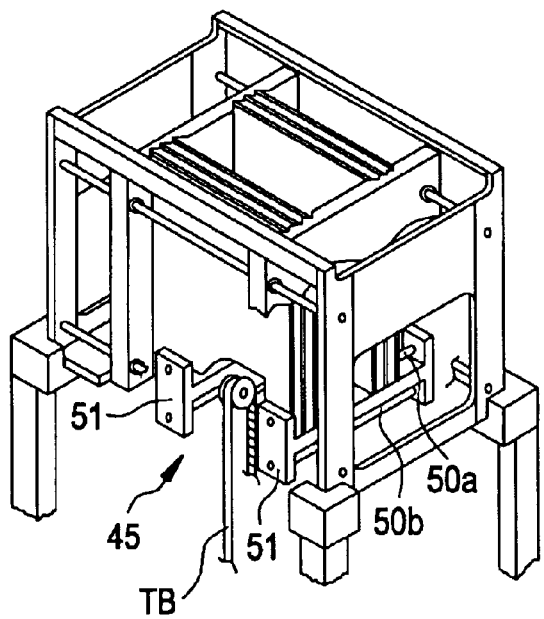
FIG. 6 is a perspective view of a cassette lying on a fifth station in an apparatus for relocating a display panel.

As illustrated in FIGS. 4 to 6, the tenth unit 34 which relocates the display panels 21 is comprised of a display panel moving unit 45 which raises and lowers the display panel 21, a display panel feeder 46 equipped at a support block 41, a display panel support unit 47 coupled to the display panel feeder 46 for supporting the display panel 21 at an upper edge thereof, a display panel holding unit 48, and a pitch, compensating unit 49 for compensating for a pitch of a side edge of the display panel 21.

Figure 7:
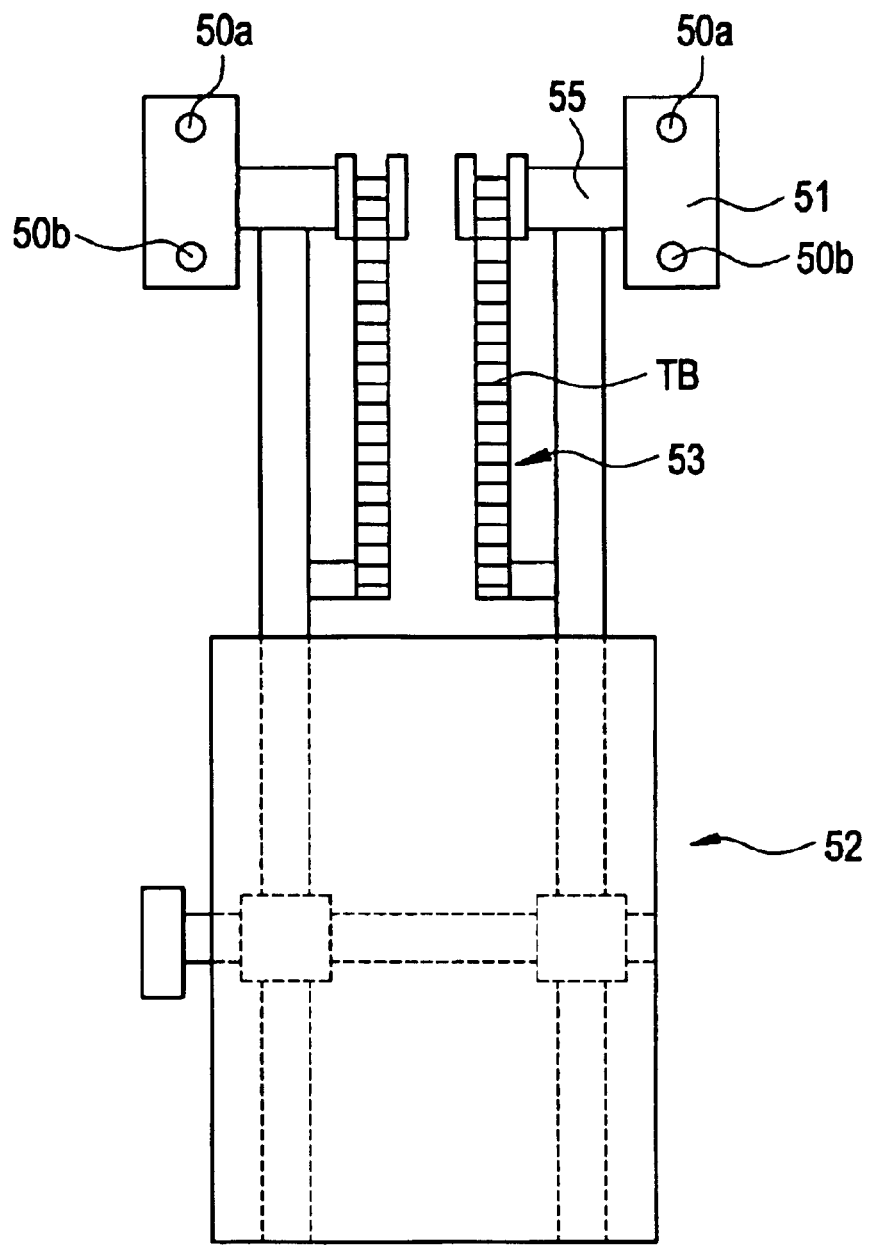
FIG. 7 is a front view of a unit for raising and lowering a display panel in an apparatus for relocating a display panel.

FIG. 6, is a perspective view of the display panel moving unit 45, and FIG. 7 is a front view of the same. As illustrated in FIGS. 6 and 7, the display panel moving unit 45 is comprised of a pair of roller guides 51 each including an upper roller 50a and a lower roller 50b both supporting the display panel 21 at a lower edge thereof, a unit 52 for adjusting a space between the upper and lower rollers 50a and 50b, a unit 53 for rotating the roller guides 51, and a drive motor (not illustrated).

The unit 53 for rotating the roller guides 51 transfers a drive force from the drive motor to rotation shafts 55 of the roller guides 51 through a timing belt TB to thereby rotate the roller guides 51.

The display panel moving unit 45 is driven by a drive motor (not illustrated) to thereby laterally move between a position under the fifth station ST5 and a position under the fourteenth station ST14 along a groove of a lateral slide guide 57 formed at the base 33.

The display panel moving unit 45 supports the display panels 21 at lower edges thereof by means of the upper and lower rollers 50a and 50b, when the display panels 21 are taken out of the first cassette 22a having stopped at the fifth station ST5, and is driven by a drive motor to thereby upwardly move to lift the display panels 21 up. The display panel moving unit 45 supports the display panels 21 at lower edges thereof by means of the upper and lower rollers 50a and 50b, when the display panels 21 are inserted into the second cassette 24a having stopped at the fourteenth station ST14, and is driven by a drive motor to thereby downwardly move to lower the display panels 21.

Since a space between the upper and lower rollers 50a and 50b both making contact with lower edges of the display panels 21 can be adjusted by means of the unit 52, it is possible to lift the display panels 21 up at a position other than a cut-out formed at a lower edge of the display panel 21, through which liquid crystal is introduced into the display panel 21. Accordingly, it would be possible for debris, dust and other foreign materials to adhere to the cut-out.

As illustrated in FIG. 4, the base 33 is formed with the sweeper units 44 below the fifth and fourteenth stations ST5 and ST14. The sweeper units 44 are designed to have a roll of sweeping sheet 56. When extra liquid crystal is adhered to the upper and lower rollers 50a and 50b, the unit 53 is operated to rotate the roller guides 51 by 180 degrees, and then, the unit 52 is operated to cause the roll of sweeping sheet 56 to make contact with the roller guides 51 for sweeping or absorbing extra liquid crystal having been adhered to the roller guides 51.

The display panel feeder 46 is coupled to the lateral slide guide 57 of the support block 41 of the tenth unit 34, and is driven by a drive motor (not illustrated) to thereby laterally move a position above the fifth station ST5 and a position above the fourteenth station ST14 along a groove formed with the lateral slide guide 57.

The display panel feeder 46 includes the display panel support unit 47, the display panel holding units 48, and the pitch compensating units 49.

As illustrated in FIG. 5, the display panel support unit 47 is comprised of a second pitch compensating unit 59 including two comb-shaped plates 58 overlapping each other. The comb-shaped plates 58 raise and lower along elongate grooves 60. As illustrated in FIG. 8B, the comb-shaped plates 58 is comprised of two plates 58a and 58b, in which the plate 58a slides relative to other plate 58b by a small distance.

The display panel holding units 48 and the pitch compensating units 49 are arranged at opposite sides of the display panel support unit 47 by two at one side. The display panel holding units 48 and the pitch compensating units 49 are designed to be able to laterally slide along the slide guide 61 of the display panel feeder 46.

The display panel holding unit 48 is comprised of holders 64 each including a first roller 62 and a second roller 63, rotary units 65 each having opposite ends at which the holders 64 are secured, and arms 66. As mentioned later, the first roller 62 supports the display panel 21 at a lower edge thereof, and the second roller 63 supports the display panel 21 at a side edge thereof. The rotary unit 65 rotates the holders 64 in a horizontal plane about an axis 67.

As mentioned earlier, the base 33 is formed at the legs 42 of the support block 41 of the tenth unit 34 with the sweeper units 43 for sweeping extra liquid crystal having been adhered to the first roller 62. FIG. 4 illustrates only one sweeper unit 43 for the sake of simplification of FIG. 4. The sweeper unit 43 has almost the same structure as that of the earlier mentioned sweeper unit 44. When extra liquid crystal is adhered to the first roller 62 supporting the display panel 21 at a lower edge thereof, the rotary units 65 are operated to rotate the holders 64, and then, the arms 66 are caused to slide to thereby cause the roll of sweeping sheet 68 to make contact with the first rollers 62 for sweeping or absorbing extra liquid crystal having been adhered to the first roller 62.

Figure 8A:
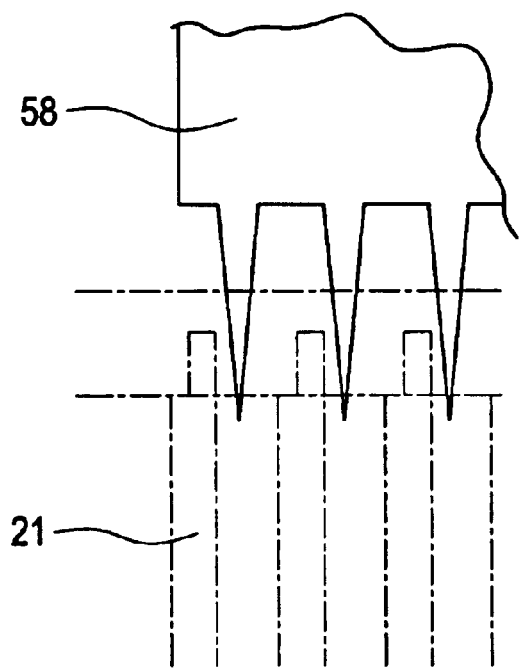
FIGS. 8A and 8B are front views illustrating how overlapping comb-shaped plates slide relative to each other.
Figure 8B:
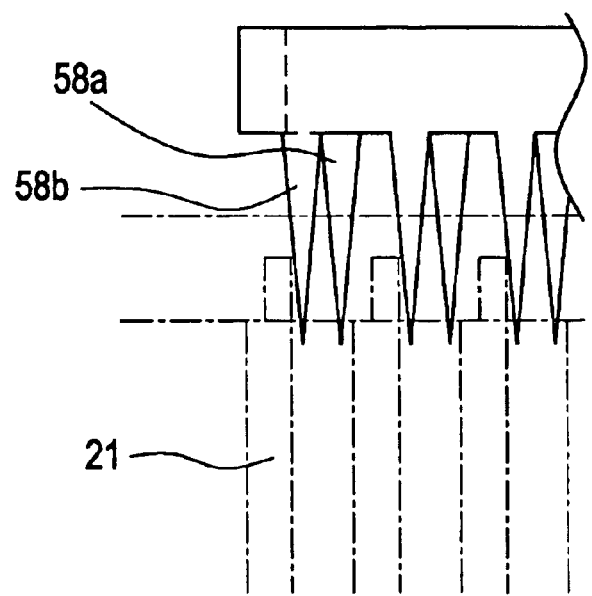

The pitch compensating units 49 includes two comb-shaped plates 69 overlapping each other, similarly to the display panel support unit 47 illustrated in FIGS. 8A and 8B. The comb-shaped plates 69 are comprised of plates 69a and 69b. The plate 69a slides relative to the plate 69b by a small distance.

The display panel feeder 46 includes a unit (not illustrated) for positioning a cassette. The display panel feeder 46 detects an edge formed on a sidewall of the first cassette 22a or the second cassette 24a having been stopped at the fifth or fourteenth station ST5 or ST14, by means of a sensor, from above, to thereby compensate for a position at which the first cassette 22a or the second cassette 24a have stopped.

Figure 9A:
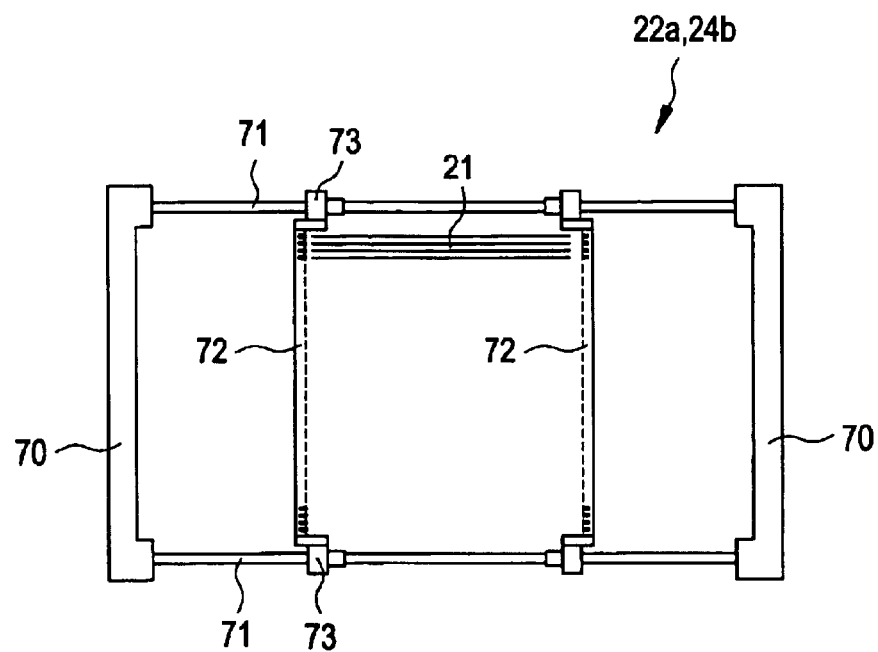
FIGS. 9A and 9B are front views of cassettes used in an apparatus for relocating a display panel.
Figure 9B:
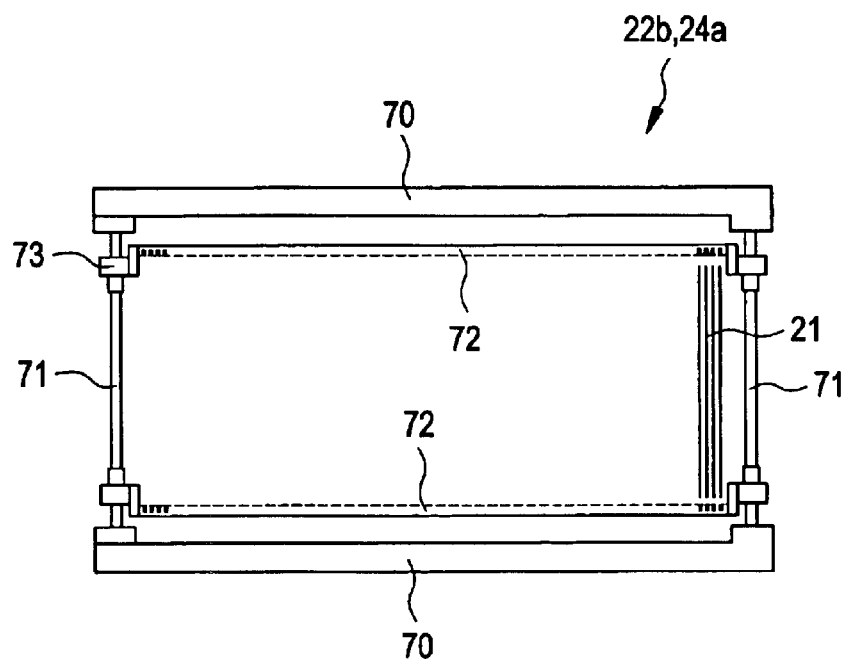

FIGS. 9A and 9B illustrates a cassette used in the above-mentioned apparatus for relocating display panels.

The cassette illustrated in FIG. 9A constitutes the first cassette 22a containing the display panels 21 therein, and the second cassette 24b containing no display panels 21. The cassette is also illustrated in FIG. 6 without a later mentioned lock unit 73. The cassette illustrated in FIG. 9B constitutes the first cassette 22b and the second cassette 24a.

As illustrated in FIG. 9A, each of the first cassette 22a and the second cassette 24b is comprised of a pair of outer frames 70, a plurality of slide shafts 71 extending between the outer frames 70, and a pair of display panel holders 72 for supporting the display panels 21. Each of the display panel holders 72 is formed at opposite ends thereof with lock units 73 slidable along the slide shafts 71. The display panels holders 72 can be fixed at a desired position along the slide shafts 71 by locking the lock units 73. Hence, a space between the opposing display panel holders 72 can be varied in accordance with a size of the display panels 21, and thus, display panels having various sizes can be accommodated in the cassette.

Figure 10:
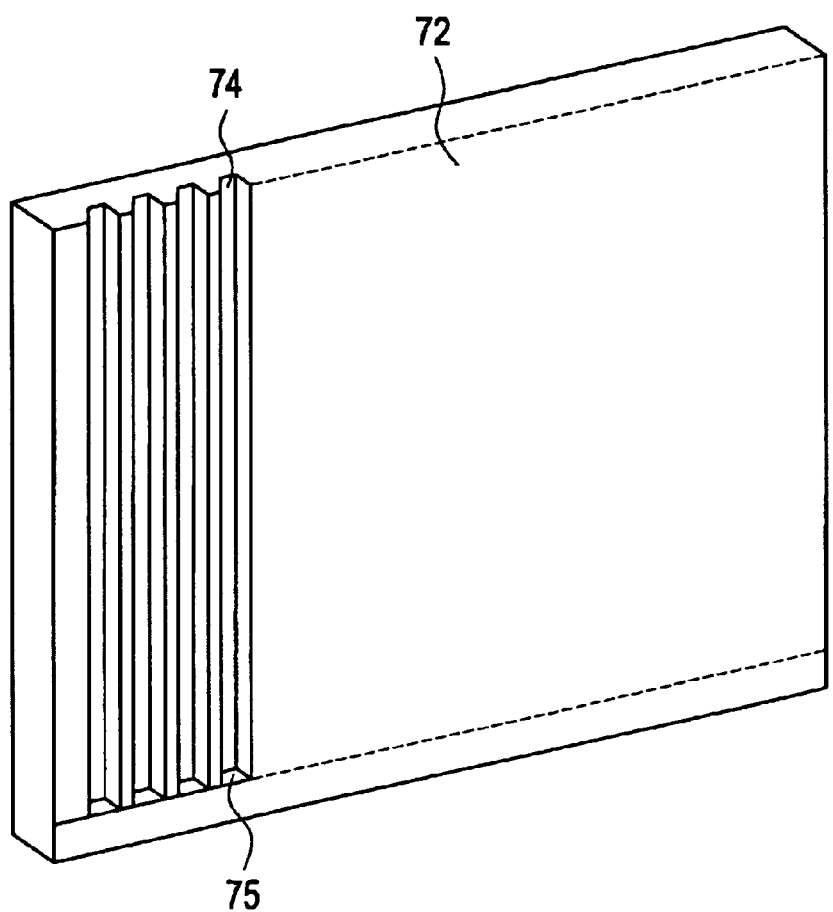
FIG. 10 is a perspective view of a display panel holder plate in a cassette used in an apparatus for relocating a display panel.

FIG. 10 is a perspective view of the display panel holder 72. As illustrated in FIG. 10, the display panel holder 72 is formed at a surface thereof with a plurality of grooves 74 each having a rectangular cross-section. The display panel 21 is inserted into the groove 74, and is supported at a termination end 75.

The first cassette 22b and the second cassette 24a illustrated in FIG. 9B are designed to have the same outer shape as that of the first cassette 22a and the second cassette 24b illustrated in FIG. 9A. The display panel holder 72 is designed to be slidable in a length-wise direction of the cassette in the first cassette 22a and the second cassette 24b illustrated in FIG. 9A, whereas the display panel holder 72 is designed to be slidable in a direction perpendicular to a length-wise direction of the cassette in the first cassette 22b and the second cassette 24a illustrated in FIG. 9B.

It should be noted that a position at which the first cassettes are supplied and a position at which the second cassettes are ejected, that is, a position of the first station ST1 and a position of the eighteenth station ST18, respectively, are not to be limited to those shown in the above-mentioned embodiment, but can be arranged in accordance with arrangement of areas in a fabrication line.

Hereinbelow is explained a relation between a line of fabricating a display panel and the above-mentioned apparatus for relocating display panels.

Figure 11A:
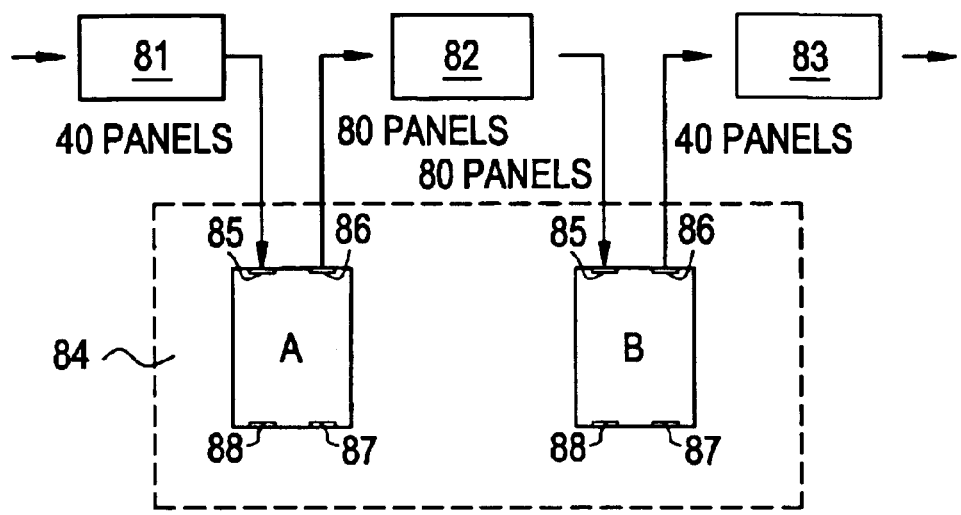
FIGS. 11A and 11B are block diagrams each illustrating a relation between an apparatus for relocating a display panel and a display panel fabrication line.

FIG. 11A is a block diagram of a line of fabricating liquid crystal display panels. As illustrated in FIG. 11A, the apparatus for relocating display panels, illustrated in FIG. 4, is installed, for instance, in a relocation step area 84 positioned in the neighborhood of a first step area 81 where glass substrates are cut into a size of a liquid crystal display panel, a second step area 82 where liquid crystal is introduced into a liquid crystal display panel, and a third step area 83 where a cutout of a display panel through which liquid crystal has been introduced into a liquid crystal display panel is closed. In this embodiment, a first apparatus A and a second apparatus B are installed in the area 84.

Each of the first and second apparatuses A and B has inlet ports 85 and 87 through which cassettes are introduced into the apparatuses and outlet ports 86 and 88 through which cassettes are drawn out of the apparatuses. The inlet ports 85, 87 and the outlet ports 86, 88 correspond to the first, tenth, eighteenth and ninth stations ST1, ST10, ST18 and ST9, respectively.

The first apparatus A receives two cassettes each including 40 liquid crystal display panels, fed from the first step area 81, and relocates totally 80 liquid crystal display panels to an empty cassette to be supplied to the second step area 82. The second apparatus B receives the cassette including 80 liquid crystal display panels, fed from the second step area 82, and relocates 40 liquid crystal display panels to each of two cassettes to be fed to the third step area 83.

The above-mentioned operation carried out in the relocation step area 84 makes it possible to increase the number of liquid crystal display panels to be processed in a step of introducing liquid crystal into a liquid crystal display panel, without changing the number (that is, 40 in the above-mentioned case) of liquid crystal display panels having been conventionally processed in both a step of cutting substrates and a step of sealing liquid crystal displays. Thus, it is possible to enhance a fabrication yield in a line of fabricating liquid crystal display panels using a conventional fabrication line as it is, without increasing the number of apparatuses for introducing liquid crystal into a liquid crystal display panel, and further without exerting any influence on both other steps and a fabrication line.

Figure 11B:
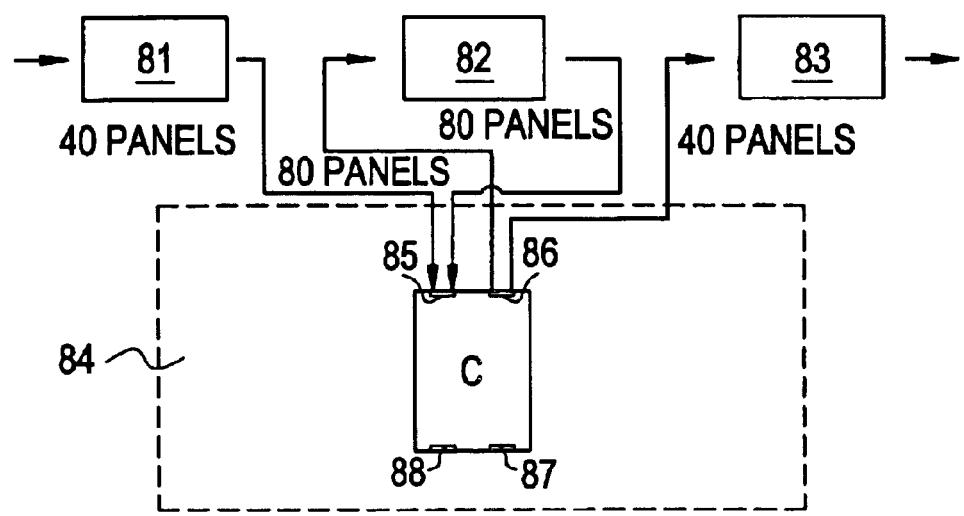

FIG. 11B is a block diagram showing another relation between a display panel fabrication line and the apparatus of relocating display panels. In this embodiment, a single apparatus C of relocating display panels is installed in the relocation step area 84. The apparatus C plays a role having been conducted by both the first and second apparatuses A and B. The apparatus C receives two cassettes each including 40 liquid crystal display panels, fed from the first step area 81, and relocates totally 80 liquid crystal display panels to an empty cassette to be supplied to the second step area 82, and further receives the cassette including 80 liquid crystal display panels, fed from the second step area 82, and relocates 40 liquid crystal display panels to each of two cassettes to be fed to the third step area 83.

As will be obvious in view of the cases illustrated in FIGS. 11A and 11B, the number of apparatuses and a location at which the apparatus is installed may be selected in dependence on a fabrication yield in a display panel fabrication line.

Hereinbelow is explained an operation of the apparatus of relocating display panels, installed in a line of fabricating liquid crystal display panels. In a case explained hereinbelow, it is assumed that the apparatus is installed in a fabrication line illustrated in FIG. 11A.

First, the first cassette 22a is transferred to the first apparatus A from the first step area 81. Specifically, the first cassette 22a in which 40 display panels 21 are accommodated in a length-wise direction of the first apparatus A is positioned in the first station ST1 in the fourth unit 27. The first cassette 22a is then intermittently transferred successively to the fifth station ST5. The first cassette 22a is compensated for as to its stop position in the fifth station ST5 by means of the unit 39 formed in the base 33 and a unit of positioning a cassette (not illustrated), formed in the display panel feeder 46.

Then, with reference to FIG. 6, the display panel moving unit 45 located below the fifth station ST5 raises to lower edges of the display panels 21 accommodated in the first cassette 22a, and thus, supports 40 display panels 21 at lower edges thereof. The comb-shaped plates 58 of the display panel support unit 47 lowers, and inserts combs of the comb-shaped plates 58 into spaces between the display panels 21 at upper edges thereof.

Since the third unit 26 is inclined about 1 degree towards the second unit 25, combs of the comb-shaped plates 58 could be readily inserted into the spaces. Then, the plate 58a slides relative to the plate 58b by a small distance. As a result, a pitch at upper edges of the display panels 21 is uniformized, and the display panels 21 are supported at upper edges thereof. By uniformizing a pitch in such a manner, it is possible to prevent the display panels 21 from making abutment with the grooves 74 of the display panel holder 72 illustrated in FIG. 10, when the display panels 21 are taken out of the cassette or inserted into the cassette, ensuring smooth relocation of the display panels 21 without no breakage of the display panels 21.

Then, the display panel moving unit 45 and the display panel support unit 47 concurrently raise with the display panels 21 being supported at lower and upper edges thereof by those units 45 and 47. Then, as illustrated in FIG. 5, the display panel holding unit 48 slides to thereby support the display panels 21 at lower and side edges thereof by the first and second rollers 62 and 63. The pitch compensating unit 49 concurrently slides to thereby cause combs of the comb-shaped plates 69 to be inserted into gaps between the display panels 21 at side edges thereof. Then, the plate 69b slides relative to the plate 69a by a small distance. As a result, a pitch at side edges of the display panels 21 is uniformized. By uniformizing a pitch in such a manner, it is possible to prevent the display panels 21 from making abutment with the grooves 74 of the display panel holder 72 illustrated in FIG. 10, when the display panels 21 are taken out of the cassette or inserted into the cassette, ensuring smooth relocation of the display panels 21 without no breakage of the display panels 21.

As mentioned so far, after the display panels 21 have been supported at upper, lower and opposite side edges thereof, the display panel moving unit 45 lowers. Thus, the display panels 21 are all taken out of the first cassette 22a at a time. The second cassette 24b from which the display panels 21 have been taken out is transferred successively to the ninth station ST9, and then, is exhausted from the apparatus of relocating the display panels.

The display panel moving unit 45 having lowered moves to a position below the fourteenth station ST14 along a groove formed at the slide guide 54.

Then, the display panel feeder 46 slides to a position above the fourteenth station ST14 with the display panels 21 being kept supported in the above-mentioned manner.

The second or empty cassette 24a mounted at the tenth station ST10 is turned by 90 degrees at the twelfth station ST12 by the cassette rotary unit 30, and then, transferred successively to the fourteenth station ST14. Similarly to the first cassette 22a, the second cassette 24a is compensated for as to its stop position in the fourteenth station ST14 by means of the unit 39 formed in the base 33 and a unit of positioning a cassette (not illustrated), formed in the display panel feeder 46. The second cassette 24a is caused to stop at such a position that when 40 display panels 21 supported above the fourteenth station ST14 lower, the 40 display panels 21 are accommodated into a half of the second cassette 24a which half is closer to the eighteenth station ST18.

In the step of accommodating the 40 display panels 21 into the second cassette 24a, the display panel moving unit 45 having transferred to a position below the fourteenth station ST14 raises to thereby support the display panels 21 at lower edges thereof. Then, after both the display panel holding unit 48 and the pitch compensating unit 49 outwardly slide, the display panel moving unit 45 and the comb-shaped plates 58 of the display panel support unit 47 concurrently lower. Thereafter, the comb-shaped plates 58 are released from the display panels 21, and then, the comb-shaped plates 58 raise. Then, the display panel moving unit 45 lowers. Thus, the 40 display panels 21 are accommodated into the second cassette 24a at a half thereof closer to the eighteenth station ST18.

Then, the second cassette 24a is forwardly moved by a distance equal to a half of a length of the cassette.

Then, 40 display panels 21 accommodated into the next first cassette 22a having been transferred to the fifth station ST5 are relocated into the second cassette 24a in the same manner as mentioned above. Thus, 80 display panels 21 are accommodated into the second cassette 24a, namely, the second cassette 24a is turned into the first cassette 22b. The first cassette 22b containing the 80 display panels 21 is turned by 90 degrees at the sixteenth station ST16, and then, transferred to the eighteenth station ST18.

The first cassette 22b is taken out of the first apparatus A through the eighteenth station ST18, and then, introduced into the second step area 82.

In the second step area 82, liquid crystal is introduced into the 80 display panels 21 having been accommodated into the first cassette 22b in the above-mentioned manner. Then, the first cassette 22b is transferred into the second apparatus B. Namely, the first cassette 22b is mounted on the first station ST1 in the second apparatus B. The second apparatus B has the same structure as that of the first apparatus A.

In the second apparatus B, the 80 display panels 21 having been accommodated into the first cassette 24b is relocated into two empty cassettes by every 40 display panels. The step of relocating the display panels 21 in the second apparatus B is identical with the step of relocating the display panels 21 in the first apparatus A except a slight difference such as the number of rotations of the cassette rotary unit 30 since 40 display panels 21 are relocated in a cycle in the tenth unit 34.

Since liquid crystal is adhered to the display panels 21 at lower edges thereof in the second step area 82, such liquid crystal is swept from the first rollers 62 and the upper and lower rollers 50a and 50b by means of the sweeper units 43 and 44.

The first cassette 22b into which 40 display panels 21 have been accommodated in the second apparatus B is transferred into the third step area 83.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-2545 filed on Jan. 8, 1999 including specification, claims, drawings and summary is incorporated herein by reference in its entirety.

What is claimed is:

1. A method of fabricating a display panel, comprising a first step and a second step, said first step is carried out immediately before said second step, said second step taking a longer time to be carried out per a display panel than that of said first step, the number of display panels to be processed in said second step being greater than the number of display panels to be processed in said first step, wherein said second step includes a relocation step of relocating display panels from a first cassette used in said first step to a second cassette used in said second step in a greater number than the number of display panels having been processed in said first step, and wherein said relocation step includes the steps of:
(a) upwardly taking a display panel out of said first cassette in which display panels are stored, with said display panel being supported at upper and lower edges thereof;
(b) supporting said display panel taken out of said first cassette, at lower and side edges thereof;
(c) laterally transferring said display panel from a position above said first cassette to a position above said second cassette; and
(d) supporting said display panel at upper and side edges thereof and lowering said display panel into said second cassette.

2. The method as set forth in claim 1, wherein said step (a) further includes the step of compensating for a pitch at an upper edge of said display panel when said display panel is supported at said upper edge thereof.

3. The method as set forth in claim 1, wherein said step (a) further includes the step of compensating for a pitch at a side edge of said display panel when said display panel is supported at said side edge thereof.

4. The method as set forth in claim 1, wherein said step (a) further includes the steps of:
(a1) transferring said first cassette including display panels, into a first station;

(a2) taking said display panels out of said first cassette in said first station; and (a3) transferring said first cassette out of said first station; and wherein said step (d) further includes the steps of:

(d1) transferring said second cassette including no display panels into a second station;

(d2) introducing display panels into said second cassette; and (d3) transferring said second cassette out of said second station.

5. The method as set forth in claim 4, wherein said first cassette is transferred in a first direction in a first stream line and said second cassette is transferred in a second direction in a second stream line, said first and second directions are opposite to each other, said first and second stream lines being spaced away from each other and being in parallel with each other.

6. The method as set forth in claim 1, further comprising a step (e) of rotating said second cassette in a horizontal plane by 90 degrees, said step (e) being to be carried out before or after said step (d).

7. The method as set forth in claim 1, further comprising a step (e) of rotating said first cassette in a horizontal plane by 90 degrees, said step (e) being to be carried out before or after said step (a).

8. The method as set forth in claim 1, wherein said first and second cassettes have the same size.

9. The method as set forth in claim 8, wherein each of said first and second cassettes is comprised of:

(a) a pair of frames;

(b) a plurality of shafts extending between said frames; and (c) a pair of panel-supporting plates, at least one of said panel-supporting plates being slidable along said shafts and being able to be fixed at any position.

10. The method as set forth in claim 1, wherein said second step is a step of introducing liquid crystal into a space formed between two substrates.

11. A method of fabricating a display panel, comprising a first step and a second step which is to be carried out immediately after said first step, said first step taking a longer time to be carried out per a display panel than that of said second step, the number of display panels to be processed in said first step being greater than the number of display panels to be processed in said second step.

12. The method as set forth in claim 11, wherein said first step includes the relocation step of relocating display panels from a first cassette used in said first step to a second cassette used in said second step in the smaller number than the number of display panels having been processed in said first step.

13. The method as set forth in claim 12, wherein said relocation step includes the steps of:

(a) upwardly taking a display panel out of said first cassette in which display panels are stored, with said display panel being supported at upper and lower edges thereof;

(b) supporting said display panel taken out of said first cassette, at lower and side edges, thereof;

(c) laterally transferring said display panel from a position above said first cassette to a position above said second cassette; and (d) supporting said display panel at upper and side edges thereof and lowering said display panel into said second cassette.

14. The method as set forth in claim 13, wherein said step (a) further includes the step of compensating for a pitch at an upper edge of said display panel when said display panel is supported at said upper edge thereof.

15. The method as set forth in claim 13, wherein said step (a) further includes the step of compensating for a pitch at a side edge of said display panel when said display panel is supported at said side edge thereof.

16. The method as set forth in claim 13, wherein said step (a) further includes the steps of:

(a1) transferring said first cassette including display panels, into a first station;

(a2) taking said display panels out of said first cassette in said first station; and (a3) transferring said first cassette out of said first station; and wherein said step (d) further includes the steps of:

(d1) transferring said second cassette including no display panels into a second station;

(d2) introducing display panels into said second cassette; and (d3) transferring said second cassette out of said second station.

17. The method as set forth in claim 16, wherein said first cassette is transferred in a first direction in a first stream line and said second cassette is transferred in a second direction in a second stream line, said first and second directions are opposite to each other, said first and second stream lines being spaced away from each other and being in parallel with each other.

18. The method as set forth in claim 13, further comprising a step (e) of rotating said second cassette in a horizontal plane by 90 degrees, said step (e) being to be carried out before or after said step (d).

19. The method as set forth in claim 13, further comprising a step (e) of rotating said first cassette in a horizontal plane by 90 degrees, said step (e) being to be carried out before or after said step (a).

20. The method as set forth in claim 13, wherein said first and second cassettes have the same size.

21. The method as set forth in claim 20, wherein each of said first and second cassettes is comprised of:

(a) a pair of frames;

(b) a plurality of shafts extending between said frames; and (c) a pair of panel-supporting plates, at least one of said panel-supporting plates being slidable along said shafts and being able to be fixed at any position.

22. The method as set forth in claim 11, wherein said first step is a step of introducing liquid crystal into a space formed between two substrates.

23. A method of fabricating a display panel, comprising a first step, a second step which is to be carried out immediately after said first step, and a third step which is to be carried out immediately after said second step, said second step taking a longer time to be carried out per a display panel than those of said first and second steps, the number of display panels to be processed in said second step being greater than both the number of display panels to be processed in said first step and the number of display panels to be processed in said third step.

24. The method as set forth in claim 23, wherein said second step includes a first relocation step of relocating display panels from a first cassette used in said first step to a second cassette used in said second step in a greater number than the number of display panels having been processed in said first step, and a second relocation step of relocating display panels from said second cassette into a third cassette used in said third step in the smaller number than the number of display panels having been processed in said second step.

25. The method as set forth in claim 24, wherein each of said first and second relocation steps includes the steps of:
    (a) upwardly taking a display panel out of said first cassette in which display panels are stored, with said display panel being supported at upper and lower edges thereof;
    (b) supporting said display panel taken out of said first cassette, at lower and side edges thereof;
    (c) laterally transferring said display panel from a position above said first cassette to a position above said second cassette; and
    (d) supporting said display panel at upper and side edges thereof and lowering said display panel into said second cassette.

26. The method as set forth in claim 25, wherein said step (a) further includes the step of compensating for a pitch at an upper edge of said display panel when said display panel is supported at said upper edge thereof.

27. The method as set forth in claim 25, wherein said step (a) further includes the step of compensating for a pitch at a side edge of said display panel when said display panel is supported at said side edge thereof.

28. The method as set forth in claim 25, wherein said step (a) further includes the steps of:
    (a1) transferring said first cassette including display panels, into a first station;
    (a2) taking said display panels out of said first cassette in said first station; and
    (a3) transferring said first cassette out of said first station;
and wherein said step (d) further includes the steps of:
    (d1) transferring said second cassette including no display panels into a second station;
    (d2) introducing display panels into said second cassette; and
    (d3) transferring said second cassette out of said second station.

29. The method as set forth in claim 28, wherein said first cassette is transferred in a first direction in a first stream line and said second cassette is transferred in a second direction in a second stream line, said first and second directions are opposite to each other, said first and second stream lines being spaced away from each other and being in parallel with each other.

30. The method as set forth in claim 25, further comprising a step (e) of rotating said second cassette in a horizontal plane by 90 degrees, said step (e) being to be carried out before or after said step (d).

31. The method as set forth in claim 25, further comprising a step (e) of rotating said first cassette in a horizontal plane by 90 degrees, said step (e) being to be carried out before or after said step (a).

32. The method as set forth in claim 24, wherein said first and second cassettes have the same size.

33. The method as set forth in claim 32, wherein each of said first and second cassettes is comprised of:
    (a) a pair of frames;
    (b) a plurality of shafts extending between said frames; and
    (c) a pair of panel-supporting plates, at least one of said panel-supporting plates being slidable along said shafts and being able to be fixed at any position.

34. The method as set forth in claim 23, wherein said second step is a step of introducing liquid crystal into a space formed between two substrates.

35. A method of fabricating a display panel, comprising a first step and a second step, said first step carried out immediately before said second step,
    said second step taking a longer time to be carried out per a display panel than that of said first step,
    the number of display panels to be processed in said second step being greater than the number of display panels having been processed in said first step,
    wherein said second step includes a relocation step of relocating display panels from a first cassette used in said first step to a second cassette used in said second step in a greater number than the number of display panels having been processed in said first step, and
    wherein said relocation step includes the steps of:
        (a) upwardly taking a display panel out of said first cassette in which display panels are stored, with said display panel being supported at upper and lower edges thereof;
        (b) supporting said display panel taken out of said first cassette, at lower and side edges thereof;
        (c) laterally transferring said display panel from a position above said first cassette to a position above said second cassette; and
        (d) supporting said display panel at upper and side edges thereof and lowering said display panel into said second cassette.

36. The method as set forth in claim 35, wherein said step (a) further includes the step of compensating for a pitch at an upper edge of said display panel when said display panel is supported at said upper edge thereof.

37. The method as set forth in claim 35, wherein said step (a) further includes the step of compensating for a pitch at a side edge of said display panel when said display panel is supported at said side edge thereof.

38. The method as set forth in claim 35, wherein said step (a) further includes the steps of:
    (1) transferring said first cassette including display panels, into a first station;
    (a2) taking said display panels out of said first cassette in said first station; and
    (a3) transferring said first cassette out of said first station;
and wherein said step (d) further includes the steps of:
    (d1) transferring said second cassette including no display panels into a second station;
    (d2) introducing display panels into said second cassette; and
    (d3) transferring said second cassette out of said second station.

39. The method as set forth in claim 38, wherein said first cassette is transferred in a first direction in a first stream line and said second cassette is transferred in a second direction in a second stream line, said first and second directions are opposite to each other, said first and second stream lines being spaced away from each other and being in parallel with each other.

40. The method as set forth in claim 35, further comprising a step (e) of rotating said second cassette in a horizontal plane by 90 degrees, said step (e) being, to be carried out before or after said step (d).

41. The method as set forth in claim 35, further comprising a step (e) of rotating said first cassette in a horizontal plane by 90 degrees, said step (e) being to be carried out before or after said step (a).

42. The method as set forth in claim 35, wherein said first and second cassettes have the same size.

43. The method as set forth in claim 42, wherein each of said first and second cassettes is comprised of:
(a) a pair of frames;
(b) a plurality of shafts extending between said frames; and
(c) a pair of panel-supporting plates, at least one of said panel-supporting plates being slidable along said shafts and being able to be fixed at any position.

44. The method as set forth in claim 35, wherein said second step is a step of introducing liquid crystal into a space formed between two substrates.

45. A method of fabricating a display panel, comprising a first step and a second step which is to be carried out immediately after said first step,
said first step taking a longer time to be carried out per a display panel than that of said second step,
the number of display panels to be processed in said first step being greater than the number of display panels to be introduced into said second step.

46. The method as set forth in claim 45, wherein said first step includes the relocation step of relocating display panels from a first cassette used in said first step to a second cassette used in said second step in the smaller number than the number of display panels having been processed in said first step.

47. The method as set forth in claim 46, wherein said relocation step includes the steps of:
(a) upwardly taking a display panel out of said first cassette in which display panels are stored, with said display panel being supported at upper and lower edges thereof;
(b) supporting said display panel taken out of said first cassette, at lower and side edges thereof;
(c) laterally transferring said display panel from a position above said first cassette to a position above said second cassette; and
(d) supporting said display panel at upper and side edges thereof and lowering said display panel into said second cassette.

48. The method as set forth in claim 47, wherein said step (a) further includes the step of compensating for a pitch at an upper edge of said display panel when said display panel is supported at said upper edge thereof.

49. The method as set forth in claim 47, wherein said step (a) further includes the step of compensating for a pitch at a side edge of said display panel when said display panel is supported at said side edge thereof.

50. The method as set forth in claim 47, wherein said step (a) further includes the steps of:
(a1) transferring said first cassette including display panels, into a first station;
(a2) taking said display panels out of said first cassette in said first station; and
(a3) transferring said first cassette out of said first station; and wherein said step (d) further includes the steps of:
(d1) transferring said second cassette including no display panels into a second station;
(d2) introducing display panels into said second cassette; and
(d3) transferring said second cassette out of said second station.

51. The method as set forth in claim 50, wherein said first cassette is transferred in a first direction in a first stream line and said second cassette is transferred in a second direction in a second stream line, said first and second directions are opposite to each other, said first and second stream lines being spaced away from each other and being in parallel with each other.

52. The method as set forth in claim 47, further comprising a step (e) of rotating said second cassette in a horizontal plane by 90 degrees, said step (e) being to be carried out before or after said step (d).

53. The method as set forth in claim 47, further comprising a step (e) of rotating said first cassette in a horizontal plane by 90 degrees, said step (e) being to be carried out before or after said step (a).

54. The method as set forth in claim 47, wherein said first and second cassettes have the same size.

55. The method as set forth in claim 54, wherein each of said first and second cassettes is comprised of:
(a) a pair of frames;
(b) a plurality of shafts extending between said frames; and
(c) a pair of panel-supporting plates, at least one of said panel-supporting plates being slidable along said shafts and being able to be fixed at any position.

56. The method as set forth in claim 45, wherein said first step is a step of introducing liquid crystal into a space formed between two substrates.

57. A method of fabricating a display panel, comprising a first step, a second step which is to be carried out immediately after said first step, and a third step which is to be carried out immediately after said second step,
said second step taking a longer time to be carried out per a display panel than those of said first and second steps,
the number of display panels to be processed in said second step being greater than both the number of display panels having been processed in said first step and the number of display panels to be introduced into said third step.

58. The method as set forth in claim 57, wherein said second step includes a first relocation step of relocating display panels from a first cassette used in said first step to a second cassette used in said second step in a greater number than the number of display panels having been processed in said first step, and a second relocation step of relocating display panels from said second cassette into a third cassette used in said third step in the smaller number than the number of display panels having been processed in said second step.

59. The method as set forth in claim 58, wherein each of said first and second relocation steps includes the steps of:
(a) upwardly taking a display panel out of said first cassette in which display panels are stored, with said display panel being supported at upper and lower edges thereof;
(b) supporting said display panel taken out of said first cassette, at lower and side edges thereof;
(c) laterally transferring said display panel from a position above said first cassette to a position above said second cassette; and
(d) supporting said display panel at upper and side edges thereof and lowering said display panel into said second cassette.

60. The method as set forth in claim 59, wherein said step (a) further includes the step of compensating for a pitch at an upper edge of said display panel when said display panel is supported at said upper edge thereof.

61. The method as set forth in claim 59, wherein said step (a) further includes the step of compensating for a pitch at a side edge of said display panel when said display panel is supported at said side edge thereof.

62. The method as set forth in claim 59, wherein said step (a) further includes the steps of:
   (a1) transferring said first cassette including display panels, into a first station;
   (a2) taking said display panels out of said first cassette in said first station; and
   (a3) transferring said first cassette out of said first station; and wherein said step (d) further includes the steps of:
   (d1) transferring said second cassette including no display panels into a second station;
   (d2) introducing display panels into said second cassette; and
   (d3) transferring said second cassette out of said second station.

63. The method as set forth in claim 62, wherein said first cassette is transferred in a first direction in a first stream line and said second cassette is transferred in a second direction in a second stream line, said first and second directions are opposite to each other, said first and second stream lines being spaced away from each other and being in parallel with each other.

64. The method as set forth in claim 59, further comprising a step (e) of rotating said second cassette in a horizontal plane by 90 degrees, said step (e) being to be carried out before or after said step (d).

65. The method as set forth in claim 59, further comprising a step (e) of rotating said first cassette in a horizontal plane by 90 degrees, said step (e) being to be carried out before or after said step (a).

66. The method as set forth in claim 59, wherein said first and second cassettes have the same size.

67. The method as set forth in claim 66, wherein each of said first and second cassettes is comprised of:
   (a) a pair of frames;
   (b) a plurality of shafts extending between said frames; and
   (c) a pair of panel-supporting plates, at least one of said panel-supporting plates being slidable along said shafts and being able to be fixed at any position.

68. The method as set forth in claim 57, wherein said second step is a step of introducing liquid crystal into a space formed between two substrates.

69. A method of relocating display panels, comprising the steps of:
   (a) upwardly taking a display panel out of a first cassette in which display panels are stored, with said display panel being supported at upper and lower edges thereof;
   (b) supporting said display panel taken out of said first cassette, at lower and side edges thereof;
   (c) laterally transferring said display panel from a position above said first cassette to a position above a second cassette; and
   (d) supporting said display panel at upper and side edges thereof and lowering said display panel into said second cassette.

70. The method as set forth in claim 69, wherein said step (a) further includes the step of compensating for a pitch at an upper edge of said display panel when said display panel is supported at said upper edge thereof.

71. The method as set forth in claim 69, wherein said step (a) further includes the step of compensating for a pitch at a side edge of said display panel when said display panel is supported at said side edge thereof.

72. The method as set forth in claim 69, wherein said step (a) further includes the steps of:
   (a1) transferring said first cassette including display panels, into a first station;
   (a2) taking said display panels out of said first cassette in said first station; and
   (a3) transferring said first cassette out of said first station; and wherein said step (d) further includes the steps of:
   (d1) transferring said second cassette including no display panels into a second station;
   (d2) introducing display panels into said second cassette; and
   (d3) transferring said second cassette out of said second station.

73. The method as set forth in claim 72, wherein said first cassette is transferred in a first direction in a first stream line and said second cassette is transferred in a second direction in a second stream line, said first and second directions are opposite to each other, said first and second stream lines being spaced away from each other and being in parallel with each other.

74. The method as set forth in claim 69, further comprising a step (e) of rotating said second cassette in a horizontal plane by 90 degrees, said step (e) being to be carried out before or after said step (d).

75. The method as set forth in claim 69, further comprising the step (e) of rotating said first cassette in a horizontal plane by 90 degrees, said step (e) being to be carried out before or after said step (a).

76. The method as set forth in claim 69, wherein said first and second cassettes have the same size.

77. The method as set forth in claim 76, wherein each of said first and second cassettes is comprised of:
   (a) a pair of frames;
   (b) a plurality of shafts extending between said frames; and
   (c) a pair of panel-supporting plates, at least one of said panel-supporting plates being, slidable along said shafts and being able to be fixed at any position.

78. The method as set forth in claim 69, wherein said display panel is a liquid crystal display panel.

\* \* \* \* \*